United States Patent
Michaelis et al.

(10) Patent No.: US 7,885,209 B1
(45) Date of Patent: Feb. 8, 2011

(54) ALTERNATIVELY ENABLING AND DISABLING THE TALK PATHS OF ENDPOINTS THAT SHARE A VIRTUAL ADDRESS

(75) Inventors: Paul Roller Michaelis, Louisville, CO (US); Vivekananda Velamala, Thornton, CO (US)

(73) Assignee: Avaya Inc., Basking Ridge, NJ (US)

( * ) Notice: Subject to any disclaimer, the term of this patent is extended or adjusted under 35 U.S.C. 154(b) by 980 days.

(21) Appl. No.: 11/732,350

(22) Filed: Apr. 3, 2007

(51) Int. Cl.
*H04L 12/16* (2006.01)
*H04L 5/14* (2006.01)

(52) U.S. Cl. .................. 370/263; 370/262; 370/270

(58) Field of Classification Search ......... 370/259–263, 370/270
See application file for complete search history.

(56) References Cited

U.S. PATENT DOCUMENTS

| | | | |
|---|---|---|---|
| 5,506,901 A | 4/1996 | Reeder | |
| 6,307,932 B1 | 10/2001 | Burritt et al. | |
| 2005/0094777 A1* | 5/2005 | McClelland | 379/52 |
| 2007/0050509 A1* | 3/2007 | Litteaut et al. | 709/227 |
| 2007/0110054 A1* | 5/2007 | Kozakai et al. | 370/389 |
| 2008/0201486 A1* | 8/2008 | Hsu et al. | 709/238 |

\* cited by examiner

*Primary Examiner*—Ronald Abelson

(57) ABSTRACT

In a communications system where a plurality of endpoints share a virtual address, all of the endpoints are involved in a communication with one of them, but only one has its talk path enabled at any one time. Each endpoint has an actuator that, when actuated, enables that endpoint's talk path and disables the other endpoints' talk paths. Preferably, one of the endpoints is either an announcement facility or a teletypewriter, while another one of the endpoints is a telephone.

19 Claims, 3 Drawing Sheets

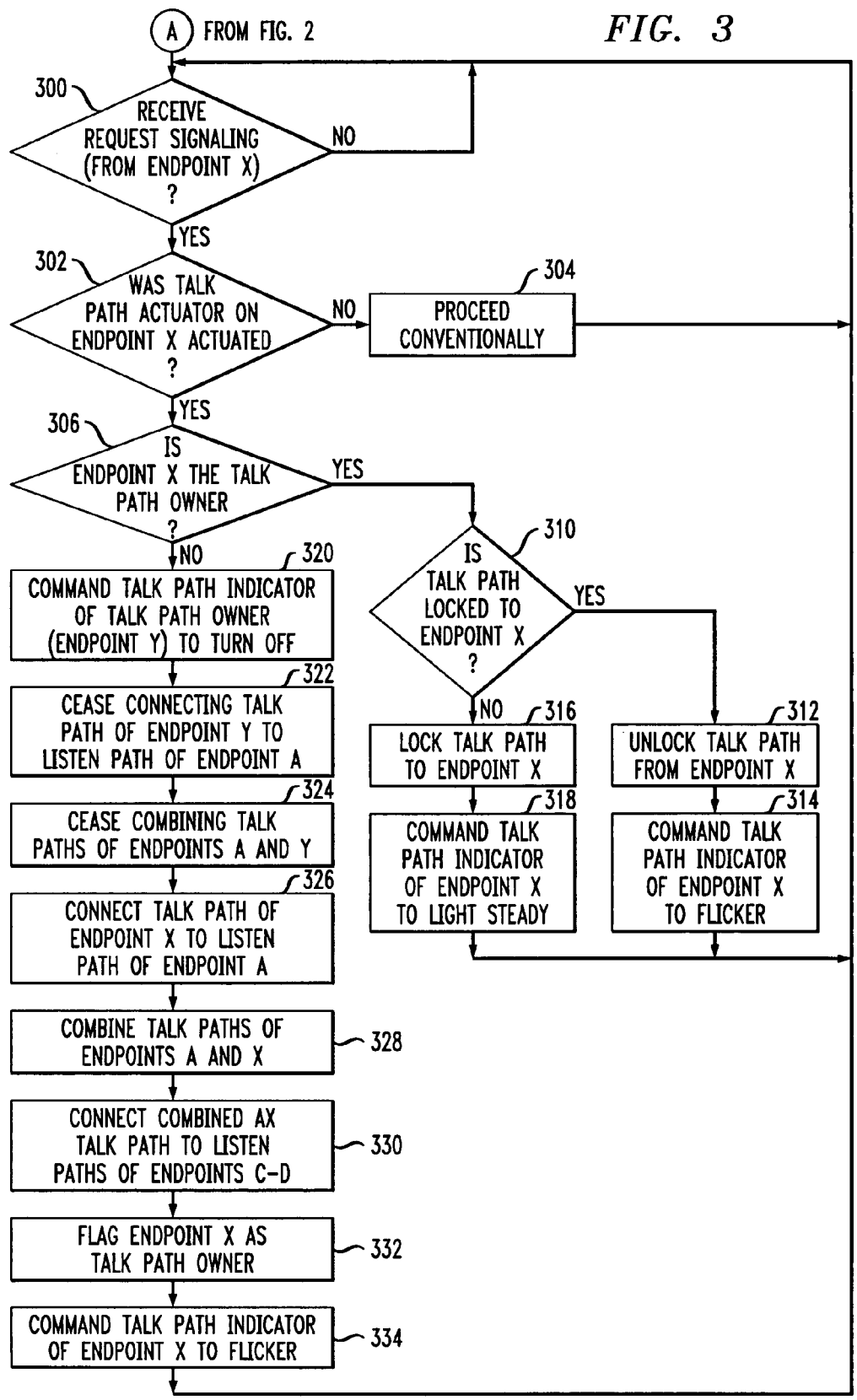

ALTERNATIVELY ENABLING AND DISABLING THE TALK PATHS OF ENDPOINTS THAT SHARE A VIRTUAL ADDRESS

TECHNICAL FIELD

This invention is directed generally to communications, and specifically to communications with endpoints that share a virtual address.

BACKGROUND OF THE INVENTION

It is often desirable to connect more than two endpoints to a communication, such as to establish a conference call between three or more endpoints, or to eavesdrop on a communication between two endpoints via a service-monitoring entity. Control over the communications paths between the multiple endpoints is often given to one of them. For example, a conference host may be able to selectively mute and unmute individual ones of the conference participants, so that they cannot either speak to the other conferees or listen to what the other conferees are saying. Or, a service-monitoring entity, such as a call-center supervisor, may be able to connect call-recording equipment to the monitored communication at will. If multiple endpoints at a common location are always to be automatically connected to a communication involving any of them, it is sometimes the practice to assign the same virtual address—such as a common extension number—to all of them. Dealing with multiple endpoints under a common address simplifies processing of the communications.

People who are hearing-impaired or unable to speak communicate via the telephone network by using specialized text terminals, commonly referred to as a telecommunication device for the deaf (TDD) or a teletypewriter (TTY). A TTY converts symbols (letters, numbers, punctuation, etc.) typed on its keyboard into audio signals that it transmits through the telephone network to another TTY. The receiving TTY converts the audio signals back into symbols and displays them on its display screen. A call between TTYs is established and terminated in the same manner as between telephones: either the TTY emulates the call signaling of a telephone, or the TTY user uses a standard telephone to initiate, dial, answer, and terminate the call, and uses the TTY only for the traffic-exchange portion of the call.

In a Voice over Internet Protocol (VoIP) network, endpoints negotiate communication call-path parameters between themselves as part of the call set-up process prior to establishing the communication path. This is necessary in VoIP systems because, unlike analog telephones on the public network, IP endpoints can generate many different types of specialized packets that vary depending on the media type. Examples include voice packets, text packets, and video packets. As a part of the call set-up process, endpoints specify the types of packets that they are able to accommodate, and then negotiate the types of packets that will be supported during the call. For calls between analog endpoints on the public network and IP endpoints, a similar call set-up negotiation occurs between the IP endpoint and the associated IP/analog gateway.

Looking now at the issue of text transmissions, text terminals such as TTYs do not emit a self-identifying handshake tone or rely on a carrier tone. (In this sense, they are different from computer modems and fax machines.) The devices are silent when not transmitting text. A complicating factor is that, when the user is typing a message, the audio tones emitted by these devices are often not transmitted reliably by the voice-optimized audio channels of VoIP systems. For this reason, VoIP networks transmit text via specialized non-audio mechanisms, such as RFC-2833 protocol ("RTP Payload for DTMF Digits, Telephony Tones and Telephony Signals").

Because the analog TTY devices are not self-identifying, if a call is placed by a TTY user on the analog public network to the user of an IP telephone, the call set-up negotiation between the IP endpoint and the associated IP/analog gateway is likely to assume erroneously that a non-text voice-only media stream and a non-text voice-only IP endpoint will be satisfactory. The result will be that the user of the IP endpoint will know that he or she has received a call from a TTY user (because distorted TTY tones will be audible on the handset), but will be unable to respond because the IP endpoint is unable to receive or transmit text packets.

SUMMARY OF THE INVENTION

Technical advance is achieved in the art by having a plurality of communications endpoints share a virtual address (such as an extension number or a top-tier Internet Protocol address) but connect to a communications network (such as a switching fabric or a local area network) at separate ports, such that all of the endpoints can participate (e.g., listen and/or signal) in a communication, but only one of those endpoints can transmit communication traffic at any one time. Preferably, each endpoint is equipped with an actuator that, when actuated, enables and the talk path of the associated terminal and disables the talk paths of the other terminals.

According to one aspect of the invention, a first communications endpoint has a transmission path that is connectable to a port of a communications system, and an actuator that is actuatable to cause the communications system to communicatively enable the transmission path of one of the first endpoint and a second communications endpoint and to communicatively disable the transmission path of the other of the first endpoint and the second endpoint when the transmission paths of both endpoints are connected to different ports of the communications system and share a virtual address in the communications system. Illustratively, the first endpoint is either an announcement facility or a TTY and the second endpoint is a voice terminal.

According to another aspect of the invention, a communications manager for a communications system is adapted to enable a first communications endpoint and a second communications endpoint, whose transmission paths are connected to different ports of the communications system, to share a virtual address in the communications system, and is adapted to respond to actuation of an actuator on one of the first endpoint and the second endpoint, by communicatively disabling the transmission path of the first endpoint and communicatively enabling the transmission path of the second endpoint.

BRIEF DESCRIPTION OF THE DRAWING

These and other features and advantages of the invention will become more apparent from considering the following description of an illustrative embodiment of the invention together with the drawing, in which:

FIGS. 2 and 3 are functional flow diagrams of operations of a communications manager of the system of FIG. 1 under control of a communications processing program of the communications manager.

DETAILED DESCRIPTION

Figure 1:
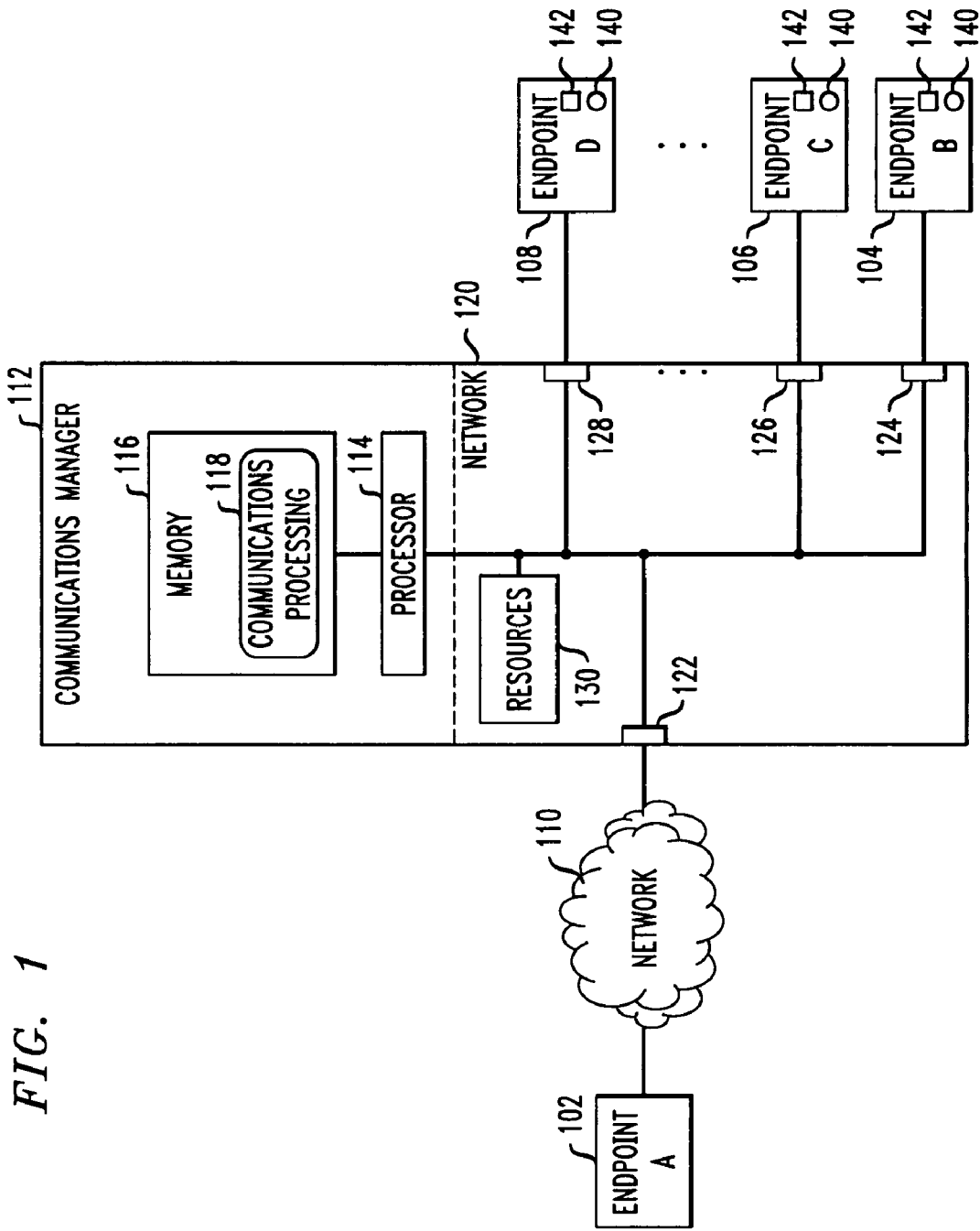
FIG. 1 is a block diagram of a communications system that includes an illustrative embodiment of the invention.

FIG. 1 shows an illustrative communications system comprising a plurality of communications endpoints 102-108 interconnected by networks 110, 112. Endpoints 102-108 may be any desired endpoints, such as a mix of standard telephones, TTYs, VoIP phones, soft phones, wireless telephones, personal digital assistants, interactive voice response systems, contact-center agent terminals, announcement systems, etc. Networks 110, 120 may likewise be any desired networks, be they analog or digital, or voice or data, such as public or private telephone networks, wide area networks such as the Internet, local area networks, etc. Endpoints 104-108 (i.e., their inputs and outputs) are interfaced to network 120 via ports 124-128, respectively. Endpoint 102 is interfaced through network 110 to network 120 via a port 122. Network 120 includes various communications-processing resources 130, such as coders and decoders (codecs), digital signal processors (DSPs), etc.

Network 120 operates under control of a communications manager 112. Communications manager 112 is a stored-program-control machine that includes a memory 116 or some other storage medium for storing programs including a communications-processing program 118, and a processor 114 for executing programs out of memory 116. If network 120 is a telephone network, communications manager 112 is a telephony switch such as a private branch exchange or a central office switch, and network 120 comprises the switching fabric of the switch. If network 120 is a VoIP network or another type of data network, then communications manager 112 is a router or a gateway and network 120 is a data-transport domain, such as a local area network.

Of course, the system of FIG. 1 may include more items such as the shown items 102-130. Only these items are shown because they suffice to illustrate the invention. As shown so far, the system of FIG. 1 is conventional.

According to one aspect of the invention, endpoints 104-108 share a common virtual address, such as an extension number or an Internet Protocol (IP address). Each endpoint 104-108 may additionally have its own unique address, such as a physical address, another IP address, etc. Each endpoint 104-108 has a "talk path" actuator 140, such as a push-button, a hard key, or a soft key, and preferably also has a visual indicator 142, such as a lamp or a light-emitting diode (LED), that is associated with actuator 140. Actuators 140 are used to specify which one of endpoints 104-108 is currently permitted to transmit communications traffic, and indicators 142 give a visual indication of that permission.

A physical communication path through a port 122-128 during an active communication comprises four logical connections: a communications traffic transmission path from the port's endpoint, referred to herein as a "talk path", a communications traffic reception path to the port's endpoint, referred to herein as a "listen path", a signaling transmission path from the port's endpoint, referred to herein as a "request path", and a signaling transmission path to the port's endpoint, referred to herein as a "command path". During a communication, all ports 122-128 (i.e., their endpoints 104-108) normally have their listen, request, and command paths open, but only port 122 and one of ports 124-128 (i.e., only endpoint 102 and one of endpoints 104-108) normally have their talk paths open, as is described below in more detail.

Figure 2:
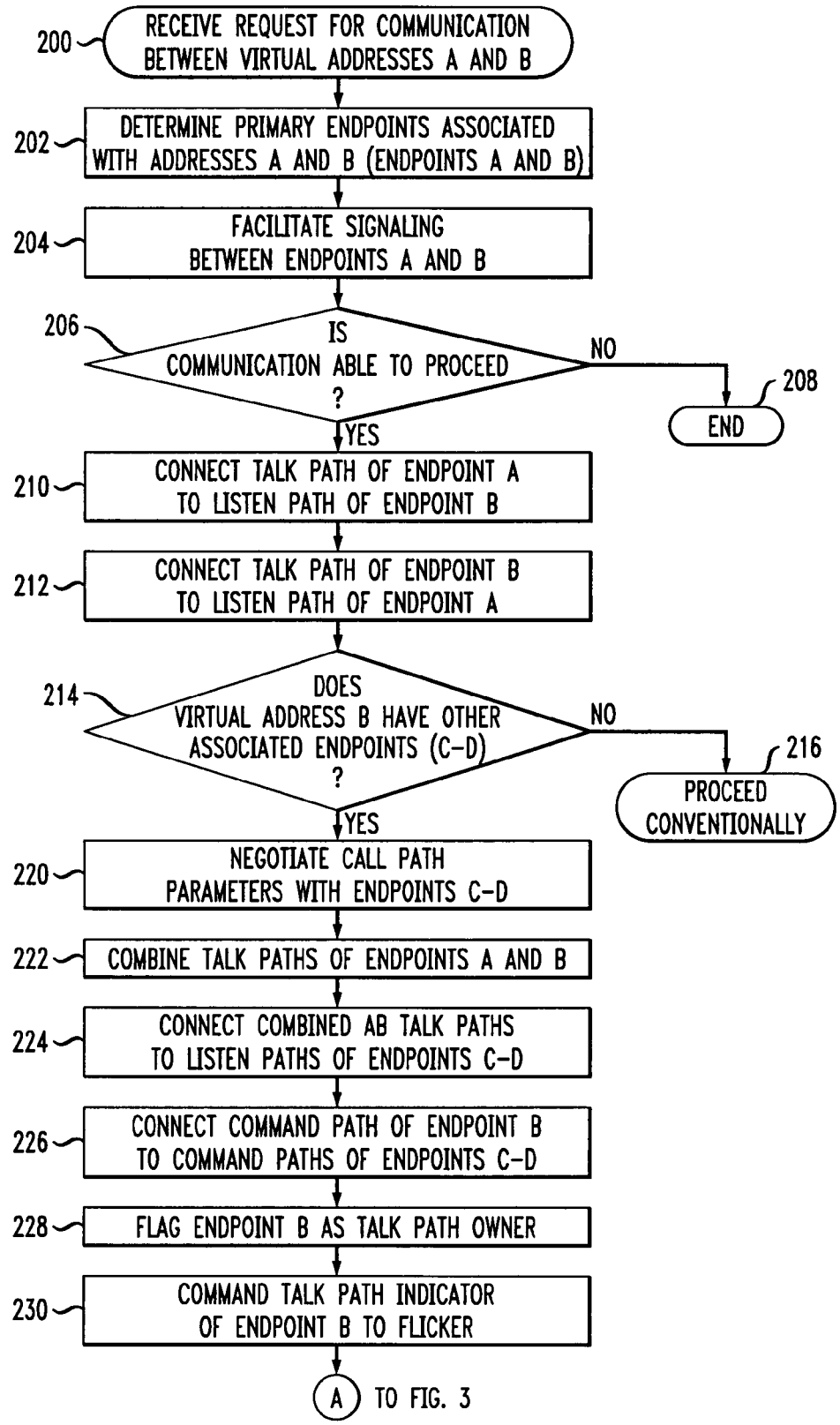

Aspects of functionality implemented by communications processing program 118 that are relevant to an understanding of the invention are shown in FIGS. 2 and 3. Endpoints 104-108 are designated in FIG. 1 as endpoints A-D, for ease of reference thereto in FIGS. 2 and 3.

Program 118 is executed by processor 114 when communications manager 112 receives a request for communications, at step 200. Suppose that the request at step 200 is from endpoint 102 or 104 for communicating between their virtual addresses A and B. In response, processor 114 determines the primary ports 122 and 124 (i.e., primary endpoints 102 and 104) that correspond to virtual addresses A and B, at step 202, and facilitates signaling between them, at step 204. The signaling may comprise ringing the called endpoint or returning a "busy" status of the called endpoint to the calling endpoint, in the case of a conventional telephony network 120, or endpoints 102 and 104 negotiating between them the parameters of the call path such as the protocol, the format, and the codecs that will be used for communicating, in the case of a VoIP network 120. Processor 114 then determines if the communication is able to proceed, at step 206. If not, the attempt at communicating ends, at step 208. If so, processor 114 connects (i.e., enables flow of) communications traffic from endpoint 102 to endpoint 104), at step 210, and connects traffic from endpoint 104 to endpoint 102, at step 212. In other words, processor 114 connects talk path of endpoint 102 to listen path of endpoint 104 and connects listen path of endpoint 102 to talk path of endpoint 104. Talk paths of both endpoints 102 and 104 are thus communicatively enabled. As described so far, the operation of processor 114 under control of program 118 is conventional.

Processor 114 checks whether virtual address B had endpoints other than endpoint 104 associated therewith, i.e., whether virtual address B is shared by a plurality of endpoints, at step 214. If not, the communications processing proceeds conventionally, at step 216.

If virtual address B is found at step 214 to be shared by a plurality of endpoints, assume for purposes of illustration that these endpoints are endpoints 106-108, also designated as endpoints C-D.

In the case of network 120 being a VoIP network, processor 114 negotiates the call path parameters of the call paths with endpoints 106 and 108, such as the protocols, the formats, and the codecs that will be used for communicating, at step 220. These may be different from the protocols, the formats, and/or the codecs used for communicating between endpoints 102 and 104. For example, different endpoints 104-108 may use different RTP streams, such as G.711 and G.729. Using resources 130, such as a DSP, processor 114 then combines (i.e., sets up combining) of communication traffic from endpoints 102 and 104, at step 222, and connects the combined traffic to endpoints 106-108, at step 226. In other words, processor 114 combines the talk paths of endpoints 102 and 104, and connects the combined talk paths to the listen paths of endpoints 106-108, so that endpoints 106-108 will each receive communication traffic from both endpoints 102 and 104. Processor 114 also connects the signaling command path of endpoint 104 to the signaling command paths of endpoints 106-108, at step 228, so that endpoints 106-108 will receive the same signaling, such as display messages, as endpoint 104. Since endpoints C-D have the same signaling ability as endpoint B, they can answer the call that is directed at endpoint B. Processor 114 also flags port 124 (i.e., endpoint 104) as being the current talk path owner, at step 230, indicating that it is the talk path of endpoint 104, and not of endpoint 106 or 108, that is currently connected to the listen path of endpoint 102. Processor 114 also signals talk path indicator 142 on endpoint 104 to flicker (instead of lighting stead on), at step 232, thereby indicating that endpoint 104 is the current talk path owner. Talk paths of endpoints 126-128 are not connected to any other paths, and thus are communicatively disabled.

Processor 114 then proceeds to monitor the signaling request paths of endpoints 104-108 for any signals, at step 300 of FIG. 3. Assume that processor 114 detects signals on a request path of endpoint X of endpoints 104-108, at step 300. Processor 114 checks whether the signals represent talk path button 140 having been pushed on endpoint X, at step 302. If not, processor 114 handles the signal in a conventional manner, at step 304, and then returns to monitor the signaling request paths, at step 300. If so, processor 114 checks whether endpoint X is flagged as the talk path owner, at step 306.

If endpoint X is flagged as the talk path owner, processor 114 checks whether the talk path is locked to endpoint X, at step 310, illustratively by checking the state of a flag of endpoint X. If so, processor 114 unlocks the talk path from endpoint X, at step 312, and signals talk path indicator 142 on endpoint X to light steady on, at step 314, to indicate that endpoint X is the talk path owner but that the talk path is not locked to endpoint X. Processor 114 then returns to step 300.

If the talk path is not found at step 310 to be locked to endpoint X, processor 114 locks the talk path to endpoint X, at step 316, illustratively by changing the state of the flag that it examined at step 310. Processor 114 also signals talk path indicator 142 on endpoint X light to flicker, at step 318, to indicate that endpoint X is the talk path owner and that the talk path is locked to endpoint X. Process 114 then returns to step 300.

Returning to step 304, if endpoint X is not found there to be the talk path owner, processor 114 checks whether the talk path is locked to the endpoint that is the talk path owner (designated as endpoint Y herein), at step 301. If so, processor 114 ignores the signal from endpoint X and returns to step 300. If not, processor 114 signals talk path indicator 142 on endpoint Y to turn off, at step 330, thereby indicating that endpoint Y no longer owns the talk path. Processor 114 also ceases connecting the talk path from endpoint Y to endpoint 102, at step 322, and ceases combining talk paths of endpoints Y and 102, at step 324. The talk path of endpoint Y is now not connected to any other path and so it is communicatively disabled. Instead, processor 114 connects talk path of endpoint X to endpoint 102, at step 326, combines talk paths of endpoints 102 and X, at step 328, and connects the combined talk path to the listen path of endpoints 106-108, at step 330. The talk path of endpoint X thus becomes communicatively enabled. Processor 114 then flags endpoint X as the new talk path owner, at step 332, and signals talk path indicator 142 of endpoint X to light steady on, at step 334, thereby indicating that endpoint X is the new talk path owner. Processor 114 then returns to step 300.

The following examples illustrate how the invention may be used to advantage.

Example 1

A receptionist is equipped with an attendant's voice-communication terminal and a personal computer that includes an audio processing module. The voice terminal is connected to port 124 and is administered in communications manager 112 with an extension number. The PC is connected to port 126 and is registered in manager 112 as "shared control with media" to the voice terminal's extension number. Hence, the voice terminal forms endpoint 104 and the PC forms endpoint 106. The receptionist records a greeting on PC 106. When endpoint 102 calls the extension of voice terminal 104 and voice terminal 104 rings, the receptionist actuates actuator 140 on PC 106 to activate the talk path of PC 106 and causes PC to play out the pre-recorded greeting to port 126. This causes the greeting to be played to calling endpoint 102. When the greeting is finished playing, or at any time before then, the receptionist actuates actuator 140 on voice terminal 104, thereby activating the talk path of voice terminal 104 and enabling the receptionist to speak with the caller via voice terminal 104.

Example 2

All transmissions on the analog PSTN are "in-band" audio, regardless of whether it is voice or TTY text. Within IP networks, the audio channels are often unable to transmit the audio tones that are produced by PSTN TTY devices. (Packet loss and audio compression tend to distort the tones.) For this reason, a manager 112 that is acting as a gateway siting between an IP network and the PSTN will transmit voice signals from the PSTN as "audio" packets within the IP network, but will transmit TTY signals that it receives from the PSTN as non-audio data packets. Because TTY signals that originate in the PSTN as audio tones are transported within the IP network as non-audio data packets, the appropriate TTY endpoint on the IP side of the gateway will not be a traditional TTY device. Instead, it will be an IP endpoint that has a display and a keyboard with the ability to encode and decode the text packets. (One may either use RFC-2833 for this purpose, or use T.140 to encode the text and RFC-4103 as the payload type.) Therefore, a person who has occasion to communicate with both hearing and hearing-impaired persons is equipped both with a VoIP telephone capable of transmitting and receiving audio packets (e.g., packets encoded using protocols such as G.711 or G.729) and with the IP equivalent of a TTY device. The appearance of such a device resembles that of a traditional TTY. The difference is that, rather than using audio tones to transmit and receive text, the IP device transmits and receives text that is encoded as non-audio IP data packets, using protocols such as RFC-2833 and RFC-4103. The telephone is connected to port 124, and is administered in communications manager 112 with an extension number. The TTY is connected to port 126 and is registered in manager 112 as "shared control with media" to the telephone's extension number. Hence, the telephone forms endpoint 104 and the TTY forms endpoint 106. When an endpoint 102 calls the extension of the telephone from an external network 110, telephone 104 is informed of an incoming call and negotiates a call path with manager 112 for a standard call. When the user of telephone 104 answers the call, endpoint 102 begins to transmit TTY signals, which telephone 104 is not set up to process. But the user of telephone 104 hears the TTY tones, and in response actuates actuator 140 on TTY 106. TTY 106 processes the incoming TTY signals, and the user to TTY 106 communicates via TTY 106 with the user of TTY 102.

Example 3

This is a combination of Examples 1 and 2. A person, such as a contact center agent, is equipped with a VoIP telephone 104 at port 124, but not an IP TTY. However, the person has a recording device 106 at port 126 that has a recording of a message such as "Please hang up and call back at xxx-xxxx.", that he or she can pay to a caller (as is common for contact center agents in non-IP environments). Of course, this recording is not a recording in the traditional sense, but is a recording of TTY text. Pressing button 140 causes device 106 to transmit a pre-defined string of IP text packets (e.g., RFC-2833 or RFC-4103 packets) that, when translated into analog audio tones by the IP/analog gateway and then delivered by the phone network to a traditional analog TTY device, causes the text "Please hang up and call back at xxx-xxxx" to be displayed for the TTY user. When the person receives a call on their VoIP telephone 104 from a TTY, he or she presses button 140 on device 106 to play the TTY recording to the caller, and then terminates the call.

Of course, various changes and modifications to the illustrative embodiment described above will be apparent to those skilled in the art. For example, it may be used for service observing without the need for a separate extension. These changes and modifications can be made without departing from the spirit and the scope of the invention and without diminishing its attendant advantages. It is therefore intended that such changes and modifications be covered by the following claims except insofar as limited by the prior art.

What is claimed is:

1. A first communications endpoint comprising:
   means for connecting a transmission path of the first endpoint to a port of a communications system; and
   an actuator actuatable once to cause the communications system to communicatively enable the transmission path of the first endpoint and to communicatively disable the transmission path of the second endpoint, and actuatable twice to prevent another actuator from causing the communications systems to communicatively disable the transmission path of the first end point and communicatively enable the transmission path of the second endpoint, when the transmission paths of both endpoints are connected to different ports of the communications system and share a virtual address in the communications system.

2. The first communications endpoint of claim 1 wherein:
   the first communications endpoint is one of an announcement facility and a telephone; and
   the second communications endpoint is another of the announcement facility and the telephone.

3. The first communications endpoint of claim 1 wherein:
   the first communications endpoint is one of a teletypewriter (TTY) and a telephone; and
   the second communications endpoint is another of the TTY and the telephone.

4. The first communications endpoint of claim 1 further comprising:
   an indicator for indicating whether the transmission path of the first communications endpoint is enabled or disabled.

5. The first communications endpoint of claim 1 wherein:
   the first endpoint supports a different format of communications than the second endpoint.

6. The first communications endpoint of claim 1 wherein:
   the first endpoint supports a different RTP stream format than the second endpoint.

7. A communications manager for a communications system, comprising:
   means for enabling a first endpoint and a second endpoint, whose transmission paths are connected to different ports of the communications system, to share a virtual address in the communications system;
   means responsive to one actuation of an actuator of the second endpoint, for communicatively disabling the transmission path of the first endpoint and communicatively enabling the transmission path of the second endpoint, and
   means responsive to two actuations of the actuator of the second endpoint, to prevent another actuator from communicatively disabling the transmission path of the second end point and communicatively enabling the transmission path of the first endpoint.

8. The communications manager of claim 7 wherein:
   the means for communicatively enabling and disabling comprise
   means responsive to actuation once of the actuator of the first endpoint, for communicatively disabling the transmission path of the second endpoint, and responsive to actuation twice of the actuator of the first endpoint, for preventing the actuator of the second endpoint from communicatively disabling the transmission path of the first endpoint and communicatively enabling the transmission path of the second endpoint.

9. The communications manager of claim 7 wherein:
   the first endpoint and the second endpoint support different formats of communications.

10. The communications manager of claim 7 further comprising:
    first means responsive to the first endpoint and the second endpoint sharing the virtual address and a communications path being established between the first endpoint and a third endpoint, for connecting a talk path of the first endpoint to a listen path of the third endpoint, for connecting a talk path of the third endpoint to a listen path of the first endpoint, and for combining the talk paths of the first and the third endpoint and connecting the combined talk path to the listen path of the second endpoint; wherein
    the means for communicatively enabling and disabling are responsive to actuation of the actuator of the second endpoint, for disconnecting the talk path of the first endpoint from the talk path of the third endpoint and connecting the talk path of the second endpoint to the talk path of the third endpoint.

11. The communications manager of claim 10 wherein:
    the means for connecting the talk paths further comprise
    means for combining the signaling command paths of the first endpoint and the second endpoint.

12. The communications manager of claim 10 wherein:
    the first endpoint supports a different format of communications on its talk and listen paths than the second endpoint supports on its talk and listen paths.

13. A communications system comprising:
    a communications network having ports;
    a first communications endpoint having a transmission path and a reception path supporting a first communications format and connected to a first port of the communications system, the first endpoint further having an actuator;
    a teletypewriter (TTY) having a transmission path and a reception path supporting a second communications format different from the first format and connected to a second port of the communications system different from the first port, the TTY and the first endpoint sharing a virtual address in the communications system, the TTY further having an actuator; and
    a communications manager responsive to the TTY and the first endpoint sharing the virtual address, for connecting the reception paths of the TTY and the first endpoint to a common signal source during a communications, and initially communicatively enabling only the transmission path of the first endpoint, further responsive to one actuation of the actuator of the TTY, for communicatively enabling the transmission path of the TTY and communicatively disabling the transmission path of the first endpoint, and further responsive to one actuation of the actuator of the first endpoint, for communicatively disabling the transmission path of the TTY and communicatively enabling the transmission path of the first endpoint, and further responsive to two actuations of the actuator of the first endpoint to prevent the actuator of the TTY from causing the transmission path of the TTY to become communicatively enabled and the transmission path of the first endpoint to become communicatively disabled.

14. A method comprising:

in response to initiation of a communication between a first endpoint and a second endpoint that shares a virtual address with a third endpoint, connecting a talk path of the first endpoint to a listen path of the second endpoint, connecting a listen path of the first endpoint to a talk path of the second endpoint, combining the talk paths of the first and the second endpoints, and connecting the combined talk path to the listen path of the third endpoint; and in response to actuation of an actuator of the third endpoint, disconnecting the talk path of the second endpoint from the listen path of the first endpoint and connecting a talk path of the third endpoint to the listen path of the first endpoint;

in response to a first actuation of an actuator of the second endpoint, disconnecting the talk path of the third endpoint from the listen path of the first endpoint and connecting the talk path of the second endpoint to the listen path of the first endpoint; and in response to a second actuation of the actuator of the second endpoint, preventing actuation of the actuator of the third endpoint from disconnecting the talk path of the second endpoint from the listen path of the first endpoint and connecting the talk path of the third endpoint to the listen path of the first endpoint.

15. The method of claim 14 further comprising:
further in response to the initiation of the communication, combining signaling command paths of the second and the third endpoints.

16. The method of claim 14 further comprising:
further in response to the actuation of the actuator of the third endpoint, causing an indicator of the third endpoint to indicate that the talk path of the third endpoint is communicatively enabled.

17. The method of claim 14 further comprising:
further in response to the first actuation of the actuator on the second endpoint, causing an indicator of the second endpoint to indicate that the talk path of the second endpoint is communicatively enabled, and causing an indicator of the third endpoint to indicate that the talk path of the third endpoint is communicatively disabled.

18. The method of claim 14 further comprising:
further in response to the second actuation of the actuator of the second endpoint, causing an indicator of the second endpoint to indicate that the talk path is communicatively enabled and locked, and causing an indicator of the third endpoint to indicate that the talk path of the third endpoint is communicatively disabled.

19. The method of claim 16 further comprising:
communicating in a first communications format on the talk and listen paths of the second endpoint; and
communicating in a different second communications format on the talk and listen paths of the third endpoint.

* * * * *